(12) United States Patent
Hamanaka

(10) Patent No.: US 12,377,682 B2
(45) Date of Patent: *Aug. 5, 2025

(54) PNEUMATIC TIRE

(71) Applicant: The Yokohama Rubber Co., LTD., Tokyo (JP)

(72) Inventor: Hideki Hamanaka, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 503 days.

This patent is subject to a terminal disclaimer.

(21) Appl. No.: 17/707,693

(22) Filed: Mar. 29, 2022

(65) Prior Publication Data

US 2022/0266631 A1 Aug. 25, 2022

Related U.S. Application Data

(62) Division of application No. 15/786,490, filed on Oct. 17, 2017, now Pat. No. 11,305,583, which is a (Continued)

(51) Int. Cl.
*B60C 3/04* (2006.01)
*B60C 9/02* (2006.01)
(Continued)

(52) U.S. Cl.
CPC .............. *B60C 3/04* (2013.01); *B60C 9/0292* (2013.01); *B60C 9/185* (2013.01); *B60C 9/20* (2013.01);
(Continued)

(58) Field of Classification Search
CPC ....... B60C 9/22; B60C 9/2204; B60C 9/1835; B60C 9/185; B60C 9/28; B60C 9/0292;
(Continued)

(56) References Cited

U.S. PATENT DOCUMENTS 3,503,432 A 3/1970 Maiocchi
3,513,898 A 5/1970 Lugli
(Continued)

FOREIGN PATENT DOCUMENTS

EP 2 233 320 A1 9/2010
EP 2 423 004 A1 2/2012
(Continued)

OTHER PUBLICATIONS

English machine translation of WO 2014/010092 A1, Jan. 16, 2014.*

*Primary Examiner* — Adrienne C. Johnstone
(74) *Attorney, Agent, or Firm* — Thorpe North & Western

(57) ABSTRACT

A pneumatic tire comprises a carcass layer, a belt layer radially outward of the carcass layer, and a tread rubber radially outward of the belt layer. The belt layer is formed by laminating a large angle belt having a belt-cord angle of 45°-70°, a pair of cross belts having belt cord angles of 10°-45° with opposite sign belt cord angles, and a reinforcing layer having a belt cord angle satisfying ±5° relative to a circumferential direction. A reinforcing layer width Ws and a carcass cross-sectional width Wca satisfy 0.60≤Ws/Wca≤0.70. A wider cross belt width Wb2 of the pair of cross belts and the carcass width Wca satisfy 0.79≤Wb2/Wca≤0.89. Relationships 0.79≤Wb2/Wca≤0.84 and either 0.82≤TW/Wca≤0.92 or 0.79≤TW/SW≤0.89 are satisfied, where TW is a tread width and SW is a total tire width.

13 Claims, 13 Drawing Sheets

Related U.S. Application Data division of application No. 14/404,131, filed as application No. PCT/JP2012/068026 on Jul. 13, 2012, now Pat. No. 9,821,607.

(51) Int. Cl.
| | | |
|---|---|---|
| *B60C 9/18* | (2006.01) | |
| *B60C 9/20* | (2006.01) | |
| *B60C 9/22* | (2006.01) | |
| *B60C 9/28* | (2006.01) | |
| *B60C 11/00* | (2006.01) | |

(52) U.S. Cl.
CPC ............. *B60C 9/2006* (2013.01); *B60C 9/22* (2013.01); *B60C 9/2204* (2013.01); *B60C 9/28* (2013.01); *B60C 11/005* (2013.01); *B60C 2009/1871* (2013.01); *B60C 2009/2012* (2013.01); *B60C 2009/2016* (2013.01); *B60C 2009/2019* (2013.01); *B60C 2009/2022* (2013.01); *B60C 2009/2051* (2013.01); *B60C 2009/2061* (2013.01); *B60C 2009/2064* (2013.01); *B60C 2009/208* (2013.01); *B60C 2009/2083* (2013.01); *B60C 2009/209* (2013.01); *B60C 2009/2093* (2013.01); *B60C 2009/2238* (2013.01); *B60C 2009/2242* (2013.01); *B60C 2009/2266* (2013.01); *B60C 2009/2276* (2013.01); *B60C 2011/0025* (2013.01); *B60C 2200/06* (2013.01); *Y10T 152/10792* (2015.01); *Y10T 152/10801* (2015.01); *Y10T 152/1081* (2015.01)

(58) Field of Classification Search
CPC .............. B60C 3/04; B60C 2009/2238; B60C 2009/2242; B60C 2009/2061; B60C 2009/2064; Y10T 152/10783; Y10T 152/10792; Y10T 152/10801; Y10T 152/1081

USPC ................. 152/454, 531–535, 537–538, 526
See application file for complete search history.

(56) References Cited

U.S. PATENT DOCUMENTS

| | | | |
|---|---|---|---|
| 4,262,726 | A | 4/1981 | Welter |
| 5,738,740 | A | 4/1998 | Cluzel |
| 5,779,828 | A | 7/1998 | Okamoto |
| 6,401,778 | B1 | 6/2002 | Cluzel |
| 7,337,817 | B2 | 3/2008 | Takagi |
| 8,528,613 | B2 * | 9/2013 | Isobe ........................ B60C 9/28 |
| | | | 152/454 X |
| 9,821,607 | B2 * | 11/2017 | Hamanaka ............ B60C 9/2204 |
| 11,305,583 | B2 * | 4/2022 | Hamanaka ................ B60C 3/04 |
| 2004/0238094 | A1 * | 12/2004 | Kajita ........................ 152/454 X |
| 2006/0169381 | A1 | 8/2006 | Radulescu et al. |
| 2009/0229722 | A1 | 9/2009 | Isobe |
| 2009/0277557 | A1 | 11/2009 | Suzuki et al. |
| 2013/0206310 | A1 | 8/2013 | Yoshikawa |
| 2014/0305566 | A1 | 10/2014 | Mashiyama |
| 2014/0345766 | A1 | 11/2014 | Wang |

FOREIGN PATENT DOCUMENTS

| | | |
|---|---|---|
| FR | 2 770 458 | 5/1999 |
| JP | 2009-018629 | 1/2009 |
| JP | 2010-006319 | 1/2010 |
| JP | 4911267 B1 | 4/2012 |
| JP | 4918948 B1 | 4/2012 |
| WO | WO 99/24269 | 5/1999 |
| WO | WO 2005/016666 | 2/2005 |
| WO | WO 20120/42873 | 4/2012 |
| WO | WO-2014/010092 A1 * | 4/2014 |

* cited by examiner

COMPARATIVE EXAMPLE

WORKING EXAMPLE

|  | Conventional Example | Comparative Example | Working Example 1 | Working Example 2 | Working Example 3 | Working Example 4 | Working Example 5 | Working Example 6 |
|---|---|---|---|---|---|---|---|---|
| Presence of circumferential reinforcing layer | Absent | Present | Present | Present | Present | Present | Present | Present |
| TW/SW | 0.92 | 0.92 | 0.89 | 0.87 | 0.79 | 0.89 | 0.89 | 0.89 |
| Ws/Wca | - | 0.75 | 0.65 | 0.65 | 0.65 | 0.65 | 0.65 | 0.65 |
| Belt angle of cross belts [°] | 20 | 20 | 20 | 20 | 20 | 20 | 20 | 20 |
| Belt angle of large angle belt [°] | 40 | 40 | 60 | 60 | 60 | 45 | 60 | 70 |
| TW/Wca | 0.96 | 0.96 | 0.93 | 0.93 | 0.93 | 0.93 | 0.93 | 0.93 |
| Wb2/Wca | 0.85 | 0.85 | 0.85 | 0.85 | 0.85 | 0.85 | 0.85 | 0.85 |
| Wb1/Wb3 | 0.80 | 0.80 | 0.80 | 0.80 | 0.80 | 0.95 | 0.95 | 0.95 |
| Yc/Ya | 0.78 | 0.78 | 0.78 | 0.78 | 0.78 | 0.78 | 0.78 | 0.78 |
| Number of ends of circumferential reinforcing layer [ends/50 mm] | - | 15 | 15 | 15 | 15 | 15 | 15 | 15 |
| Number of ends of large angle belt [ends/50 mm] | 13 | 13 | 13 | 13 | 13 | 13 | 13 | 13 |
| Number of ends of cross belt [ends/50 mm] | 15 | 15 | 15 | 15 | 15 | 15 | 15 | 15 |
| Es [Mpa] | - | 4.0 | 4.0 | 4.0 | 4.0 | 4.0 | 4.0 | 4.0 |
| Es/E1 | - | 0.80 | 0.80 | 0.80 | 0.80 | 0.80 | 0.80 | 0.80 |
| Es/E2, Es/E3 | - | 0.80 | 0.80 | 0.80 | 0.80 | 0.80 | 0.80 | 0.80 |
| λs [%] | 150 | 150 | 150 | 150 | 150 | 150 | 150 | 150 |
| λ1 [%] | 150 | 150 | 150 | 150 | 150 | 150 | 150 | 150 |
| λ2, λ3 [%] | 150 | 150 | 150 | 150 | 150 | 150 | 150 | 150 |
| Ebc [Mpa] | 1.2 | 1.2 | 1.2 | 1.2 | 1.2 | 1.2 | 1.2 | 1.2 |
| λbc [%] | 300 | 300 | 300 | 300 | 300 | 300 | 300 | 300 |
| T1 [mm] | 0.30 | 0.30 | 0.30 | 0.30 | 0.30 | 0.30 | 0.30 | 0.30 |
| S/Wb3 | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure |
| Belt-belt separation resistance | 100 | 105 | 107 | 106 | 104 | 106 | 108 | 106 |
| Belt edge separation resistance | 100 | 95 | 101 | 102 | 104 | 103 | 104 | 103 |

FIG. 7a

| | Working Example 7 | Working Example 8 | Working Example 9 | Working Example 10 | Working Example 11 | Working Example 12 | Working Example 13 | Working Example 14 |
|---|---|---|---|---|---|---|---|---|
| Presence of circumferential reinforcing layer | Present | Present | Present | Present | Present | Present | Present | Present |
| TW/SW | 0.89 | 0.89 | 0.90 | 0.90 | 0.90 | 0.87 | 0.87 | 0.87 |
| Ws/Wca | 0.65 | 0.65 | 0.65 | 0.65 | 0.65 | 0.65 | 0.65 | 0.65 |
| Belt angle of cross belts [°] | 20 | 20 | 20 | 20 | 20 | 20 | 20 | 20 |
| Belt angle of large angle belt [°] | 60 | 60 | 60 | 60 | 60 | 60 | 60 | 60 |
| TW/Wca | 0.93 | 0.93 | 0.92 | 0.91 | 0.82 | 0.91 | 0.91 | 0.91 |
| Wb2/Wca | 0.85 | 0.85 | 0.85 | 0.85 | 0.85 | 0.85 | 0.85 | 0.85 |
| Wb1/Wb3 | 0.85 | 1.05 | 0.95 | 0.95 | 0.95 | 0.95 | 0.95 | 0.95 |
| Yc/Ya | 0.78 | 0.78 | 0.78 | 0.78 | 0.78 | 0.80 | 0.85 | 0.90 |
| Number of ends of circumferential reinforcing layer [ends/50 mm] | 15 | 15 | 15 | 15 | 15 | 15 | 15 | 15 |
| Number of ends of large angle belt [ends/50 mm] | 13 | 13 | 13 | 13 | 13 | 13 | 13 | 13 |
| Number of ends of cross belt [ends/50 mm] | 15 | 15 | 15 | 15 | 15 | 15 | 15 | 15 |
| Es [Mpa] | 4.0 | 4.0 | 4.0 | 4.0 | 4.0 | 4.0 | 4.0 | 4.0 |
| Es/E1 | 0.80 | 0.80 | 0.80 | 0.80 | 0.80 | 0.80 | 0.80 | 0.80 |
| Es/E2, Es/E3 | 0.80 | 0.80 | 0.80 | 0.80 | 0.80 | 0.80 | 0.80 | 0.80 |
| λs [%] | 150 | 150 | 150 | 150 | 150 | 150 | 150 | 150 |
| λ1 [%] | 150 | 150 | 150 | 150 | 150 | 150 | 150 | 150 |
| λ2, λ3 [%] | 150 | 150 | 150 | 150 | 150 | 150 | 150 | 150 |
| Fbc [Mpa] | 1.2 | 1.2 | 1.2 | 1.2 | 1.2 | 1.2 | 1.2 | 1.2 |
| λbc [%] | 300 | 300 | 300 | 300 | 300 | 300 | 300 | 300 |
| T1 [mm] | 0.30 | 0.30 | 0.30 | 0.30 | 0.30 | 0.30 | 0.30 | 0.30 |
| S/Wb3 | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure |
| Belt-belt separation resistance | 107 | 107 | 109 | 108 | 106 | 110 | 111 | 110 |
| Belt edge separation resistance | 103 | 103 | 103 | 104 | 106 | 105 | 107 | 106 |

FIG. 7b

|  | Working Example 15 | Working Example 16 | Working Example 17 | Working Example 18 | Working Example 19 | Working Example 20 | Working Example 21 | Working Example 22 | Working Example 23 |
|---|---|---|---|---|---|---|---|---|---|
| Presence of circumferential reinforcing layer | Present | Present | Present | Present | Present | Present | Present | Present | Present |
| TW/SW | 0.87 | 0.87 | 0.87 | 0.87 | 0.87 | 0.87 | 0.87 | 0.87 | 0.87 |
| Ws/Wca | 0.65 | 0.65 | 0.65 | 0.65 | 0.65 | 0.65 | 0.65 | 0.65 | 0.65 |
| Belt angle of cross belts [°] | 20 | 20 | 20 | 20 | 20 | 20 | 20 | 20 | 20 |
| Belt angle of large angle belt [°] | 60 | 60 | 60 | 60 | 60 | 60 | 60 | 60 | 60 |
| TW/Wca | 0.91 | 0.91 | 0.91 | 0.91 | 0.91 | 0.91 | 0.91 | 0.91 | 0.91 |
| Wb2/Wca | 0.85 | 0.85 | 0.85 | 0.85 | 0.85 | 0.85 | 0.85 | 0.85 | 0.85 |
| Wb1/Wb3 | 0.95 | 0.95 | 0.95 | 0.95 | 0.95 | 0.95 | 0.95 | 0.95 | 0.95 |
| Yc/Ya | 0.85 | 0.85 | 0.85 | 0.85 | 0.85 | 0.85 | 0.85 | 0.85 | 0.85 |
| Number of ends of circumferential reinforcing layer [ends/50 mm] | 17 | 22 | 30 | 22 | 22 | 22 | 22 | 22 | 22 |
| Number of ends of large angle belt [ends/50 mm] | 13 | 13 | 13 | 15 | 21 | 25 | 21 | 21 | 21 |
| Number of ends of cross belt [ends/50 mm] | 15 | 15 | 15 | 15 | 15 | 15 | 18 | 23 | 28 |
| Es [Mpa] | 4.0 | 4.0 | 4.0 | 4.0 | 4.0 | 4.0 | 4.0 | 4.0 | 4.0 |
| Es/E1 | 0.80 | 0.80 | 0.80 | 0.80 | 0.80 | 0.80 | 0.80 | 0.80 | 0.80 |
| Es/E2, Es/E3 | 0.80 | 0.80 | 0.80 | 0.80 | 0.80 | 0.80 | 0.80 | 0.80 | 0.80 |
| λs [%] | 150 | 150 | 150 | 150 | 150 | 150 | 150 | 150 | 150 |
| λ1 [%] | 150 | 150 | 150 | 150 | 150 | 150 | 150 | 150 | 150 |
| λ2, λ3 [%] | 150 | 150 | 150 | 150 | 150 | 150 | 150 | 150 | 150 |
| Ebc [Mpa] | 1.2 | 1.2 | 1.2 | 1.2 | 1.2 | 1.2 | 1.2 | 1.2 | 1.2 |
| λbc [%] | 300 | 300 | 300 | 300 | 300 | 300 | 300 | 300 | 300 |
| T1 [mm] | 0.30 | 0.30 | 0.30 | 0.30 | 0.30 | 0.30 | 0.30 | 0.30 | 0.30 |
| S/Wb3 | 0.02 | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure | Single structure |
| Belt-belt separation resistance | 112 | 114 | 112 | 115 | 117 | 115 | 119 | 121 | 119 |
| Belt edge separation resistance | 107 | 107 | 107 | 107 | 107 | 107 | 107 | 107 | 107 |

FIG. 8a

| | Working Example 24 | Working Example 25 | Working Example 26 | Working Example 27 | Working Example 28 | Working Example 29 | Working Example 30 | Working Example 31 | Working Example 32 |
|---|---|---|---|---|---|---|---|---|---|
| Presence of circumferential reinforcing layer | Present | Present | Present | Present | Present | Present | Present | Present | Present |
| TW/SW | 0.87 | 0.87 | 0.87 | 0.87 | 0.87 | 0.87 | 0.87 | 0.87 | 0.87 |
| Ws/Wca | 0.65 | 0.65 | 0.65 | 0.65 | 0.65 | 0.65 | 0.65 | 0.65 | 0.65 |
| Belt angle of cross belts [°] | 20 | 20 | 20 | 20 | 20 | 20 | 20 | 20 | 20 |
| Belt angle of large angle belt [°] | 60 | 60 | 60 | 60 | 60 | 60 | 60 | 60 | 60 |
| TW/Wca | 0.91 | 0.91 | 0.91 | 0.91 | 0.91 | 0.91 | 0.91 | 0.91 | 0.91 |
| Wb2/Wca | 0.85 | 0.85 | 0.85 | 0.85 | 0.85 | 0.85 | 0.85 | 0.85 | 0.85 |
| Wb1/Wb3 | 0.95 | 0.95 | 0.95 | 0.95 | 0.95 | 0.95 | 0.95 | 0.95 | 0.95 |
| Yc/Ya | 0.85 | 0.85 | 0.85 | 0.85 | 0.85 | 0.85 | 0.85 | 0.85 | 0.85 |
| Number of ends of circumferential reinforcing layer [ends/50 mm] | 22 | 22 | 22 | 22 | 22 | 22 | 22 | 22 | 22 |
| Number of ends of large angle belt [ends/50 mm] | 21 | 21 | 21 | 21 | 21 | 21 | 21 | 21 | 21 |
| Number of ends of cross belt [ends/50 mm] | 23 | 23 | 23 | 23 | 23 | 23 | 23 | 23 | 23 |
| Es [Mpa] | 4.5 | 6.0 | 7.5 | 6.0 | 6.0 | 6.0 | 6.0 | 6.0 | 6.0 |
| Es/E1 | 0.80 | 0.80 | 0.80 | 0.90 | 1.00 | 1.10 | 1.00 | 1.00 | 1.00 |
| Es/E2, Es/E3 | 0.80 | 0.80 | 0.80 | 0.90 | 0.80 | 0.80 | 0.90 | 1.00 | 1.00 |
| λs [%] | 150 | 150 | 150 | 150 | 150 | 150 | 150 | 150 | 150 |
| λ1 [%] | 150 | 150 | 150 | 150 | 150 | 150 | 150 | 150 | 150 |
| λ2, λ3 [%] | 150 | 150 | 150 | 150 | 150 | 150 | 150 | 150 | 150 |
| Ebc [Mpa] | 1.2 | 1.2 | 1.2 | 1.2 | 1.2 | 1.2 | 1.2 | 1.2 | 1.2 |
| λbc [%] | 300 | 300 | 300 | 300 | 300 | 300 | 300 | 300 | 300 |
| T1 [mm] | 0.30 | 0.30 | 0.30 | 0.30 | 0.30 | 0.30 | 0.30 | 0.30 | 0.30 |
| S/Wb3 | 0.02 | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure | Single structure |
| Belt-belt separation resistance | 122 | 123 | 122 | 125 | 126 | 125 | 127 | 128 | 127 |
| Belt edge separation resistance | 108 | 109 | 108 | 110 | 111 | 110 | 112 | 113 | 112 |

FIG. 8b

| | Working Example 33 | Working Example 34 | Working Example 35 | Working Example 36 | Working Example 37 | Working Example 38 | Working Example 39 | Working Example 40 | Working Example 41 |
|---|---|---|---|---|---|---|---|---|---|
| Presence of circumferential reinforcing layer | Present | Present | Present | Present | Present | Present | Present | Present | Present |
| TW/SW | 0.87 | 0.87 | 0.87 | 0.87 | 0.87 | 0.87 | 0.87 | 0.87 | 0.87 |
| Ws/Wca | 0.65 | 0.65 | 0.65 | 0.65 | 0.65 | 0.65 | 0.65 | 0.65 | 0.65 |
| Belt angle of cross belts [°] | 20 | 20 | 20 | 20 | 20 | 20 | 20 | 20 | 20 |
| Belt angle of large angle belt [°] | 60 | 60 | 60 | 60 | 60 | 60 | 60 | 60 | 60 |
| TW/Wca | 0.91 | 0.91 | 0.91 | 0.91 | 0.91 | 0.91 | 0.91 | 0.91 | 0.91 |
| Wb2/Wca | 0.85 | 0.85 | 0.85 | 0.85 | 0.85 | 0.85 | 0.85 | 0.85 | 0.85 |
| Wb1/Wb3 | 0.95 | 0.95 | 0.95 | 0.95 | 0.95 | 0.95 | 0.95 | 0.95 | 0.95 |
| Yc/Ya | 0.85 | 0.85 | 0.85 | 0.85 | 0.85 | 0.85 | 0.85 | 0.85 | 0.85 |
| Number of ends of circumferential reinforcing layer [ends/50 mm] | 22 | 22 | 22 | 22 | 22 | 22 | 22 | 22 | 22 |
| Number of ends of large angle belt [ends/50 mm] | 21 | 21 | 21 | 21 | 21 | 21 | 21 | 21 | 21 |
| Number of ends of cross belt [ends/50 mm] | 23 | 23 | 23 | 23 | 23 | 23 | 23 | 23 | 23 |
| Es [Mpa] | 6.0 | 6.0 | 6.0 | 6.0 | 6.0 | 6.0 | 6.0 | 6.0 | 6.0 |
| Es/E1 | 1.00 | 1.00 | 1.00 | 1.00 | 1.00 | 1.00 | 1.00 | 1.00 | 1.00 |
| Es/E2, Es/E3 | 1.00 | 1.00 | 1.00 | 1.00 | 1.00 | 1.00 | 1.00 | 1.00 | 1.00 |
| λs [%] | 200 | 250 | 250 | 250 | 250 | 250 | 250 | 250 | 250 |
| λ1 [%] | 150 | 150 | 200 | 250 | 250 | 250 | 250 | 250 | 250 |
| λ2, λ3 [%] | 150 | 150 | 150 | 150 | 200 | 150 | 250 | 250 | 250 |
| Ebc [Mpa] | 1.2 | 1.2 | 1.2 | 1.2 | 1.2 | 1.2 | 1.5 | 2.3 | 3.0 |
| λbc [%] | 300 | 300 | 300 | 300 | 300 | 300 | 300 | 300 | 300 |
| T1 [mm] | 0.30 | 0.30 | 0.30 | 0.30 | 0.30 | 0.30 | 0.30 | 0.30 | 0.30 |
| S/Wb3 | 0.02 | 0.02 | 0.02 | 0.02 | 0.02 | 0.02 | 0.02 | 0.02 | 0.02 |
| Belt edge cushion structure | Single structure | Single structure | Single structure | Single structure | Single structure | Single structure | Single structure | Single structure | Single structure |
| Belt-belt separation resistance | 129 | 130 | 131 | 132 | 134 | 136 | 136 | 136 | 136 |
| Belt edge separation resistance | 114 | 115 | 116 | 117 | 118 | 119 | 121 | 124 | 123 |

|  | Working Example 42 | Working Example 43 | Working Example 44 | Working Example 45 | Working Example 46 | Working Example 47 | Working Example 48 | Working Example 49 |
|---|---|---|---|---|---|---|---|---|
| Presence of circumferential reinforcing layer | Present | Present | Present | Present | Present | Present | Present | Present |
| TW/SW | 0.87 | 0.87 | 0.87 | 0.87 | 0.87 | 0.87 | 0.87 | 0.87 |
| Ws/Wca | 0.65 | 0.65 | 0.65 | 0.65 | 0.65 | 0.65 | 0.65 | 0.65 |
| Belt angle of cross belts [°] | 20 | 20 | 20 | 20 | 20 | 20 | 20 | 20 |
| Belt angle of large angle belt [°] | 60 | 60 | 60 | 60 | 60 | 60 | 60 | 60 |
| TW/Wca | 0.91 | 0.91 | 0.91 | 0.91 | 0.91 | 0.91 | 0.91 | 0.91 |
| Wb2/Wca | 0.85 | 0.85 | 0.85 | 0.85 | 0.85 | 0.85 | 0.85 | 0.85 |
| Wb1/Wb3 | 0.95 | 0.95 | 0.95 | 0.95 | 0.95 | 0.95 | 0.95 | 0.95 |
| Yc/Ya | 0.85 | 0.85 | 0.85 | 0.85 | 0.85 | 0.85 | 0.85 | 0.85 |
| Number of ends of circumferential reinforcing layer [ends/50 mm] | 22 | 22 | 22 | 22 | 22 | 22 | 22 | 22 |
| Number of ends of large angle belt [ends/50 mm] | 21 | 21 | 21 | 21 | 21 | 21 | 21 | 21 |
| Number of ends of cross belt [ends/50 mm] | 23 | 23 | 23 | 23 | 23 | 23 | 23 | 23 |
| Es [Mpa] | 6.0 | 6.0 | 6.0 | 6.0 | 6.0 | 6.0 | 6.0 | 6.0 |
| Es/E1 | 1.00 | 1.00 | 1.00 | 1.00 | 1.00 | 1.00 | 1.00 | 1.00 |
| Es/E2, Es/E3 | 1.00 | 1.00 | 1.00 | 1.00 | 1.00 | 1.00 | 1.00 | 1.00 |
| λs [%] | 2.50 | 2.50 | 2.50 | 2.50 | 2.50 | 2.50 | 2.50 | 2.50 |
| λ1 [%] | 2.50 | 2.50 | 2.50 | 2.50 | 2.50 | 2.50 | 2.50 | 2.50 |
| λ2, λ3 [%] | 2.50 | 2.50 | 2.50 | 2.50 | 2.50 | 2.50 | 2.50 | 2.50 |
| Ebc [Mpa] | 2.3 | 2.3 | 2.3 | 2.3 | 2.3 | 2.3 | 2.3 | 2.3 |
| λbc [%] | 400 | 470 | 470 | 470 | 470 | 470 | 470 | 470 |
| T1 [mm] | 0.30 | 0.30 | 0.50 | 0.80 | 0.50 | 0.50 | 0.50 | 0.50 |
| S/Wb3 | 0.02 | 0.02 | 0.02 | 0.02 | 0.03 | 0.05 | 0.10 | 0.10 |
| Belt edge cushion structure | Single structure | Single structure | Single structure | Single structure | Single structure | Single structure | Single structure | Two-color structure |
| Belt-belt separation resistance | 136 | 136 | 138 | 140 | 140 | 140 | 140 | 140 |
| Belt edge separation resistance | 127 | 129 | 129 | 129 | 130 | 131 | 132 | 135 |

PNEUMATIC TIRE

RELATED APPLICATIONS

This application is a divisional of U.S. Pat. No. 11,305,583 issued Apr. 19, 2022, which is a divisional of U.S. Pat. No. 9,821,607 issued Nov. 21, 2017, which is a national stage application of International Patent Application No. PCT/JP2012/068026 filed on Jul. 13, 2012, which are each incorporated herein by reference.

TECHNICAL FIELD

The present invention relates to a pneumatic tire, and more particularly relates to a pneumatic tire that can improve the tire durability.

BACKGROUND

Conventional pneumatic tires have a circumferential reinforcing layer in a belt layer. A circumferential reinforcing layer is a belt ply having a belt angle that is substantially 0° with respect to a tire circumferential direction, and is disposed so as to be laminated upon a pair of cross belts. The technology disclosed in Japanese Patent No. 4642760, Japanese Patent No. 4663638, and Japanese Patent No. 4663639 includes conventional pneumatic tires that are configured in this manner.

SUMMARY

The present technology provides a pneumatic tire whereby the tire durability can be improved.

A pneumatic tire according to the present invention comprises a carcass layer, a belt layer disposed on an outer side of the carcass layer in a tire radial direction, and a tread rubber disposed on the outer side of the belt layer in the tire radial direction. In such a pneumatic tire, the belt layer is formed by laminating a large angle belt having a belt angle of not less than 45° and not more than 70° in absolute values, a pair of cross belts having a belt angle not less than 10° and not more than 45° in absolute values and having belt angles of mutually opposite signs, and a circumferential reinforcing layer having a belt angle within a range of ±5° with respect to the tire circumferential direction; and a tread width TW and a total tire width SW have a relationship such that $0.79 \leq TW/SW \leq 0.89$, and a width Ws of the circumferential reinforcing layer and a cross-sectional width Wca of the carcass layer have a relationship such that $0.60 \leq Ws/Wca \leq 0.70$.

Moreover, the pneumatic tire according to the present invention comprises a carcass layer, a belt layer disposed on an outer side of the carcass layer in a tire radial direction, and a tread rubber disposed on the outer side of the belt layer in the tire radial direction. In such a pneumatic tire, the belt layer is formed by laminating a large angle belt having a belt angle of not less than 45° and not more than 70° in absolute values, a pair of cross belts having a belt angle not less than 10° and not more than 45° in absolute values and having belt angles of mutually opposite signs, and a circumferential reinforcing layer having a belt angle within a range of ±5° with respect to the tire circumferential direction; and a tread width TW and a cross-sectional width Wca of the carcass layer have a relationship such that $0.82 \leq TW/Wca \leq 0.92$, and a width Ws of the circumferential reinforcing layer and the cross-sectional width Wca of the carcass layer have a relationship such that $0.60 \leq Ws/Wca \leq 0.70$.

In the pneumatic tire according to the present invention, there is an advantage that stiffness in the tire circumferential direction is reinforced and tire durability is improved due to the belt layer having the circumferential reinforcing layer. Furthermore, a difference in radial growths between the center region and a shoulder region is alleviated and the contact pressure distribution in a tire width direction is made uniform due to the ratio TW/SW being within the above range. As a result, there is an advantage that a load on the belt layer is distributed and tire durability is improved. Moreover, there is an advantage that tire durability is improved due to the ratio Ws/Wca being within the above range.

Also, with the pneumatic tire according to the present invention, a difference in radial growth between the center region and the shoulder region is alleviated and the contact pressure distribution in the tire width direction is made uniform due to the ratio TW/Wca being within the above range. As a result, there is an advantage that a load on the belt layer is distributed and tire durability is improved.

BRIEF DESCRIPTION OF THE DRAWINGS

FIGS. 7a-7b include a table showing results of performance testing of pneumatic tires according to embodiments of the present invention.

FIGS. 8a-8b include a table showing results of performance testing of pneumatic tires according to embodiments of the present invention.

FIGS. 9a-9b include a table showing results of performance testing of pneumatic tires according to embodiments of the present invention.

DETAILED DESCRIPTION

The present invention is described below in detail with reference to the drawings. However, the present invention is not limited to these embodiments. Moreover, constituents of the embodiment which can possibly or obviously be substituted while maintaining consistency with the present invention are included. Furthermore, the multiple modified examples described in the embodiment can be combined as desired within the scope apparent to a person skilled in the art.

Pneumatic Tire

Figure 1:
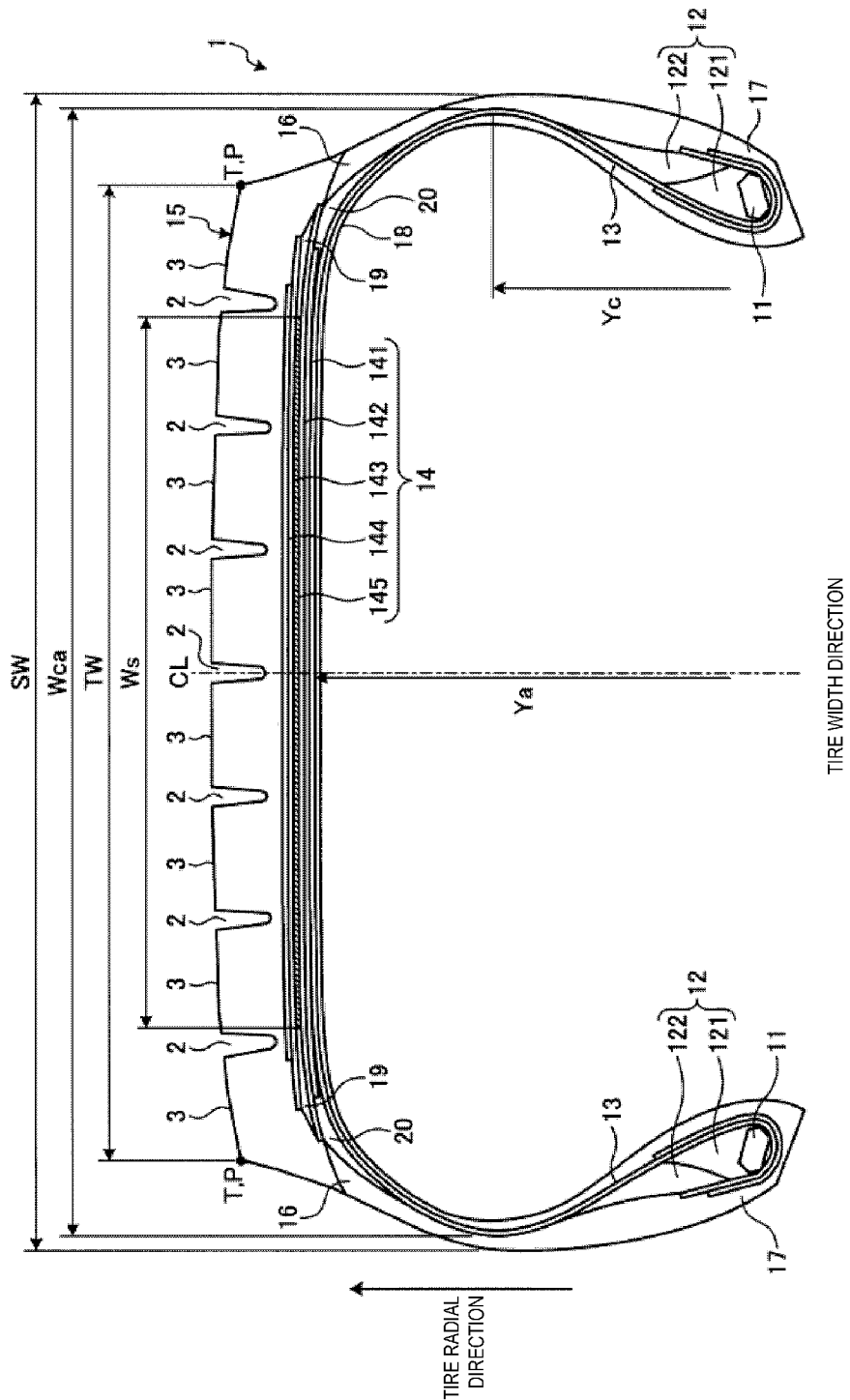
FIG. 1 is a cross-sectional view in a tire meridian direction illustrating a pneumatic tire according to an embodiment of the present invention.

FIG. 1 is a cross-sectional view in a tire meridian direction illustrating a pneumatic tire 1 according to an embodiment of the present invention. In this drawing, a radial tire for heavy loads that is mounted on trucks, buses, and the like for long-distance transport is illustrated as an example of the pneumatic tire 1. Note that the symbol CL refers to a tire equator plane. Moreover, a tread edge P and a tire ground contact edge T are in accord with each other in FIG. 1. A circumferential reinforcing layer 145 in FIG. 1 is indicated by hatching.

The pneumatic tire 1 includes a pair of bead cores 11,11, a pair of bead fillers 12,12, a carcass layer 13, a belt layer 14, tread rubber 15, a pair of side wall rubbers 16,16, and a pair of rim cushion rubbers 17, 17 (see FIG. 1).

The pair of bead cores 11,11 have annular structures and constitute cores of left and right bead portions. The pair of bead fillers 12,12 are formed from a lower filler 121 and an upper filler 122, and are disposed on a periphery of each of the pair of bead cores 11,11 in the tire radial direction so as to reinforce the bead portions.

The carcass layer 13 stretches between the left and right bead cores 11 and 11 in toroidal form, forming a framework for the tire. Additionally, both ends of the carcass layer 13 are folded from the inner side in the tire width direction toward the outer side in the tire width direction and fixed so as to wrap around the bead cores 11 and the bead fillers 12. Also, the carcass layer 13 is constituted by a plurality of carcass cords formed from steel or organic fibers (for example, nylon, polyester, rayon, or the like), covered by coating rubber, and subjected to a rolling process, having a carcass angle (the angle of inclination of the fiber direction of the carcass cords with respect to the tire circumferential direction) of not less than 85° and not greater than 95° in absolute values.

The belt layer 14 is formed by laminating a plurality of belt plies 141 to 145, and disposing the belts to extend over an outer circumference of the carcass layer 13. A detailed configuration of the belt layer 14 is described below.

The tread rubber 15 is disposed on the periphery of the carcass layer 13 and the belt layer 14 in the tire radial direction, and forms a tire tread. The pair of side wall rubbers 16,16 is disposed on each outer side of the carcass layer 13 in the tire width direction, so as to form left and right side wall portions of the tire. The pair of rim cushion rubbers 17, 17 are respectively disposed on the outer side in the tire width direction of the left and right bead cores 11, 11 and bead fillers 12, 12 to constitute left and right bead portions.

In the configuration in FIG. 1, the pneumatic tire 1 includes seven circumferential main grooves 2 that extend in the tire circumferential direction, and eight land portions 3 partitioned and formed by the circumferential main grooves 2. The land portions 3 are formed of blocks that are segmented in the tire circumferential direction by ribs or lug grooves (not illustrated in the drawings) that continue in the tire circumferential direction.

Belt Layer

Figure 2:
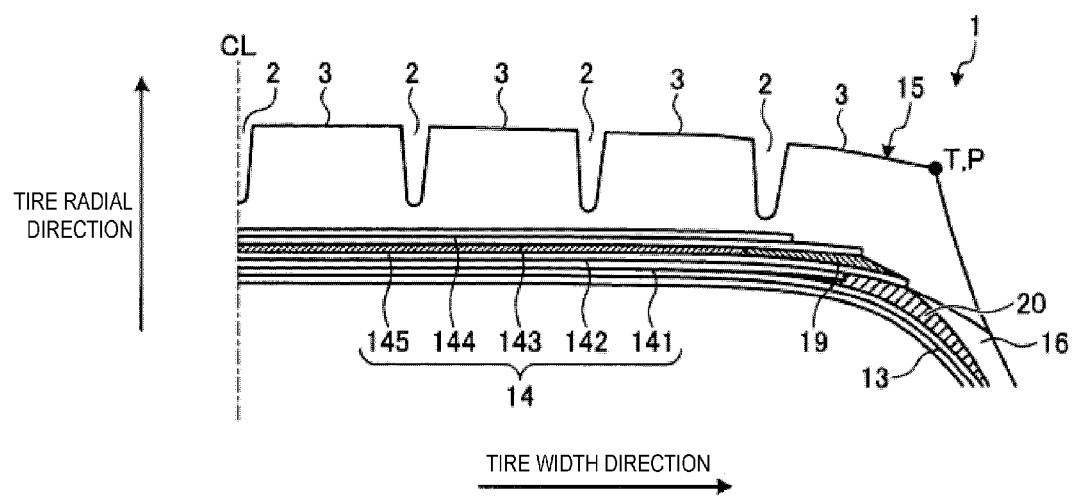
FIG. 2 is an explanatory view illustrating a belt layer of the pneumatic tire depicted in FIG. 1.
Figure 3:
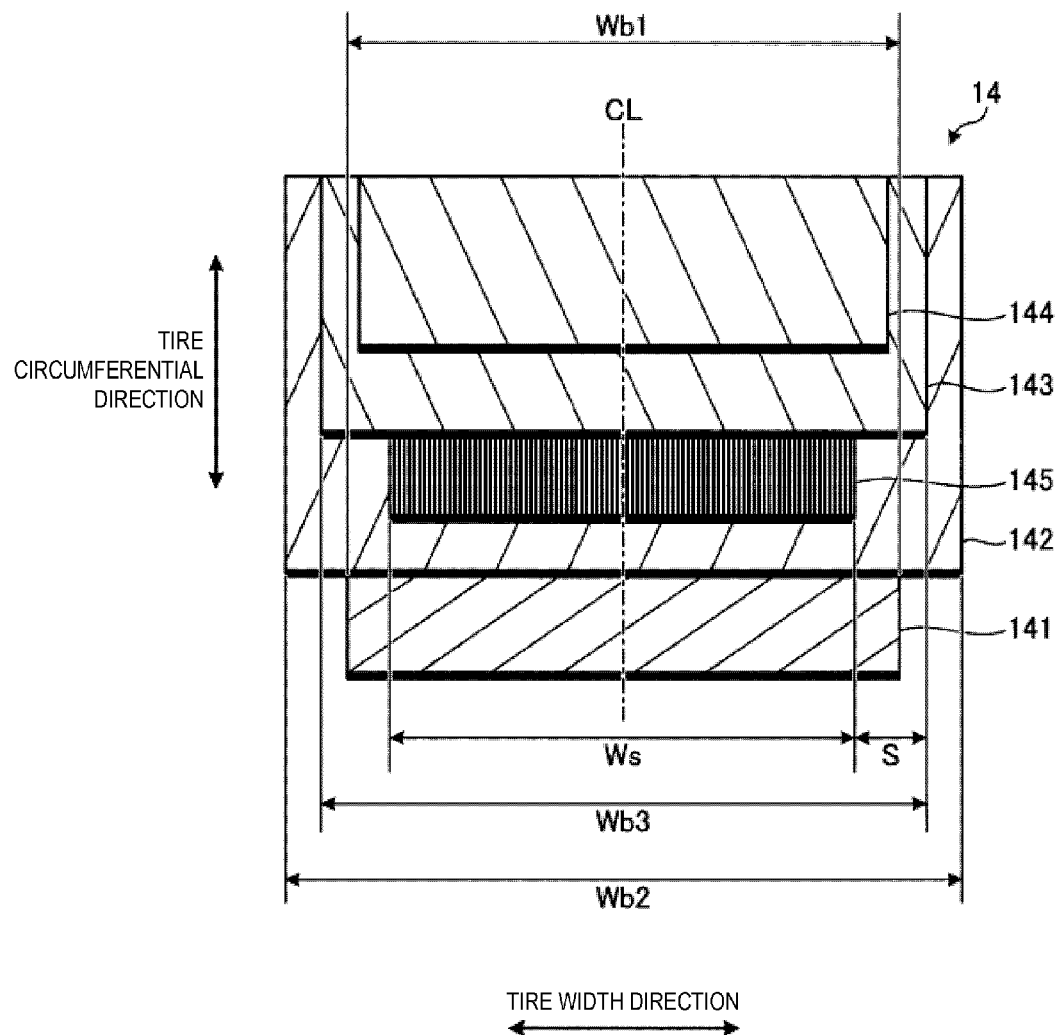
FIG. 3 is an explanatory view illustrating the belt layer of the pneumatic tire depicted in FIG. 1.
Figure 4:
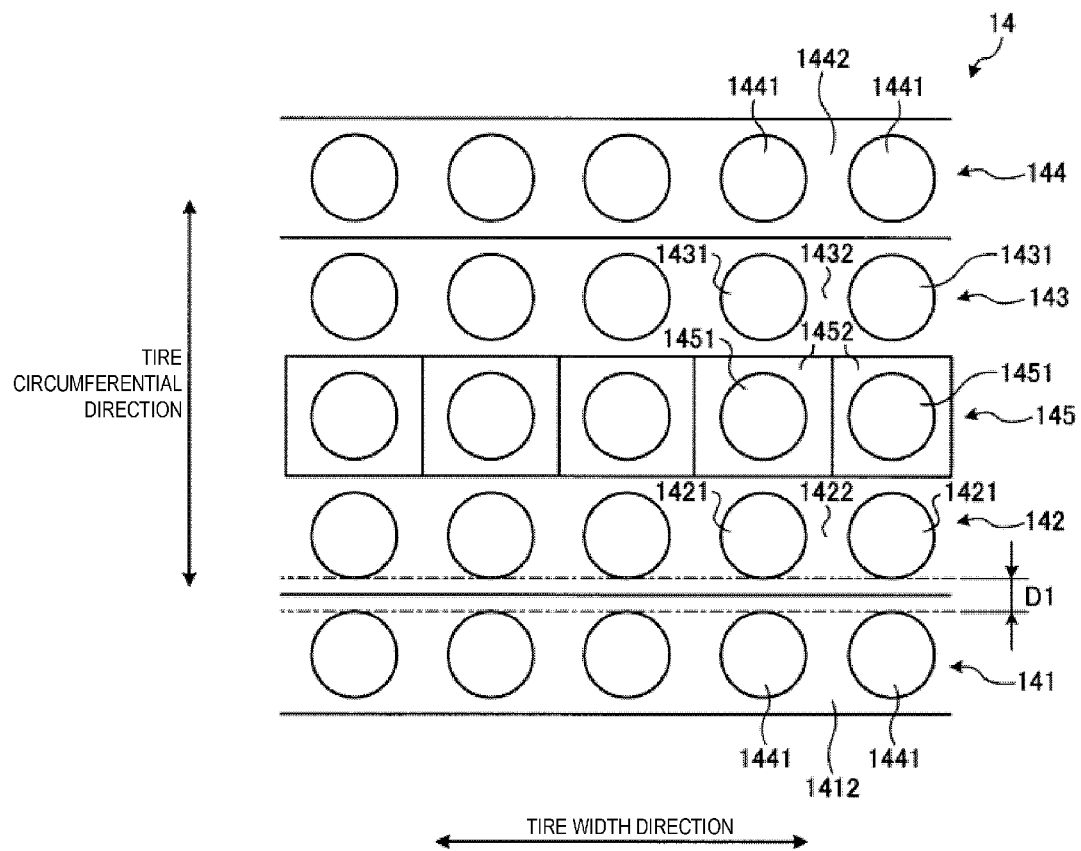
FIG. 4 is an explanatory view illustrating the belt layer of the pneumatic tire depicted in FIG. 1.

FIGS. 2 to 4 are explanatory views illustrating a belt layer of the pneumatic tire depicted in FIG. 1. In these drawings, FIG. 2 illustrates a region on one side of the tread portion demarcated by the tire equatorial plane CL, and FIGS. 3 and 4 illustrate a laminated structure of the belt layer 14. The circumferential reinforcing layer 145, a belt edge cushion 19, and a belt cushion 20 in FIG. 2 are indicated by hatching. The thin lines in the belt plies 141 to 145 in FIG. 3 schematically represent the inclination of belt cords.

The belt layer 14 is formed by laminating a large angle belt 141, a pair of cross belts 142, 143, a belt cover 144, and a circumferential reinforcing layer 145, disposed on the periphery of the carcass layer 13 (see FIG. 2).

The large angle belt 141 is configured by a plurality of belt cords formed from steel or organic fibers, covered by coating rubber, and subjected to a rolling process, having a belt angle (angle of inclination of belt cord fiber direction with respect to the tire circumferential direction) of not less than 45° and not more than 70° in absolute values. Moreover, the large angle belt 141 is disposed so as to be laminated outward in the tire radial direction of the carcass layer 13.

The pair of cross belts 142, 143 are configured by a plurality of belt cords formed from steel or organic fibers, covered by coating rubber, and subjected to a rolling process, having a belt angle of not less than 10° and not more than 45° in absolute values. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated in the drawings). Moreover, the pair of cross belts 142, 143 are disposed so as to be laminated outward in the tire radial direction of the large angle belt 141.

Also, the belt cover 144 is configured by a plurality of belt cords formed from steel or organic fibers, covered by coating rubber, and subjected to a rolling process, having a belt angle of not less than 10° and not more than 45° in absolute values. Moreover, the belt cover 144 is disposed so as to be laminated outward in the tire radial direction of the cross belts 142, 143. In this embodiment, the belt cover 144 has the same belt angle as the outer-side cross belt 143, and is disposed in the outermost layer of the belt layer 14.

The circumferential reinforcing layer 145 is configured by steel belt cords that are covered by coating rubber and wound in a spiral manner with an inclination within a range of ±5° with respect to the tire circumferential direction. Additionally, the circumferential reinforcing layer 145 is disposed so as to be interposed between the pair of cross belts 142, 143. Additionally, the circumferential reinforcing layer 145 is disposed inward in the tire width direction of left and right edge portions of the pair of cross belts 142, 143. Specifically, one or a plurality of wires is wound spirally around the periphery of the inner-side cross belt 142, to form the circumferential reinforcing layer 145. This circumferential reinforcing layer 145 reinforces the stiffness in the tire circumferential direction. As a result, the tire durability is improved.

In the pneumatic tire 1, the belt layer 14 may have an edge cover (not illustrated in the drawings). Generally, the edge cover is constituted by a plurality of belt cords formed from steel or organic fibers, covered by coating rubber, and subjected to a rolling process, having a belt angle of not less than 0° and not greater than 5° in absolute values. Additionally, edge covers are disposed outward in the tire radial direction of the left and right edge portions of the outer-side cross belt 143 (or the inner-side cross belt 142). As a result of the band effect of the edge cover, the difference in radial growth of a tread center region and a shoulder region is reduced, and the uneven wear resistance performance of the tire is improved.

Separation Suppression Structure

Recent heavy duty tires singly mounted on trucks, buses and the like demonstrate improved tire durability due to the tires having a low aspect ratio and the disposition of the circumferential reinforcing layer in the belt layer.

In the configuration in which the belt layer has the circumferential reinforcing layer, there is a problem that (a) separation of the rubber around the edge portions of the belt plies and (b) separation of the rubber (coating rubber covering belt cords of belt plies) between contiguous belt plies occur easily due to the increased stiffness of the belt layer in the tire circumferential direction.

Accordingly, the pneumatic tire 1 uses the following configuration to suppress the occurrence of the above separations and to improve tire durability performance (see FIGS. 1 to 3).

As illustrated in FIG. 1, a tread width TW and a total tire width SW in the pneumatic tire 1 have a relationship such that $0.79 \leq TW/SW \leq 0.89$.

Figure 10:
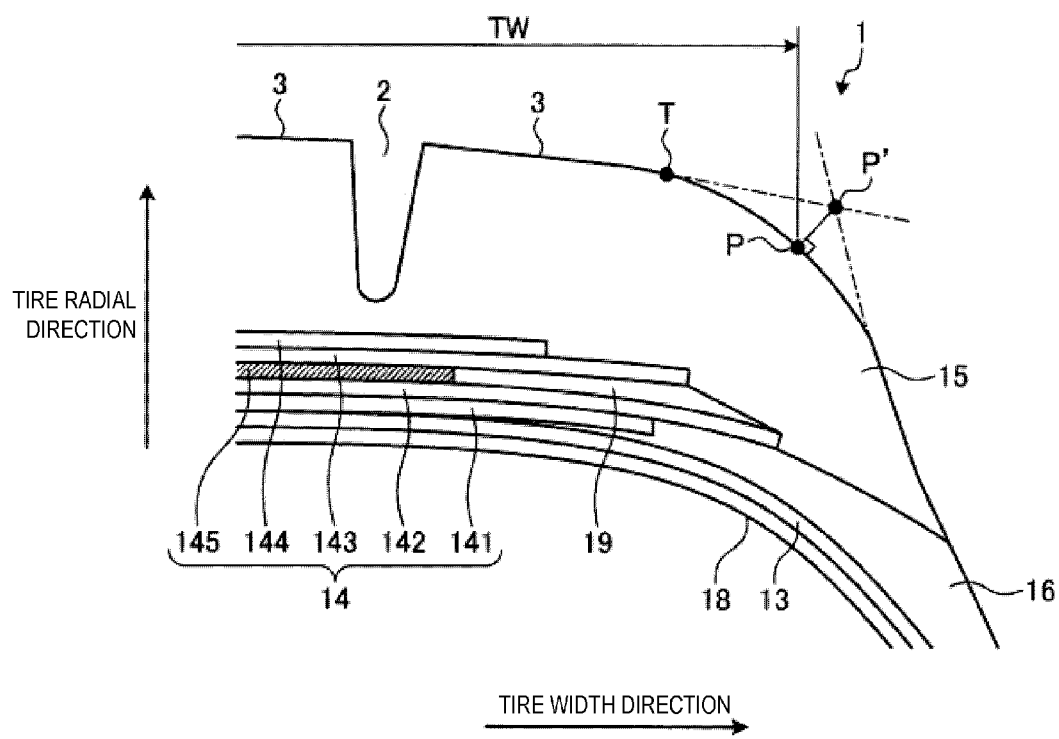
FIG. 10 is an explanatory view illustrating a shoulder portion having a round shape.

The tread edge P refers to a point of the tread edge portion in a configuration having a (1) square shaped shoulder portion. For example, in the configuration in FIG. 2, the tread edge P and a tire ground contact edge T are in accord with each other due to the shoulder portion having a square shape. Conversely, (2) in the configuration as illustrated in FIG. 10 where the shoulder portion has a round shape, an intersection P' is taken from the tread portion profile and the sidewall portion profile when viewed as a cross-section from the tire meridian direction cross-section, and the tread edge P is taken as the bottom of a perpendicular line drawn from the intersection P' to the shoulder portion.

Note that the "tire ground contact edge T" refers to the maximum width position in a tire axial direction of a contact surface between the tire and a flat plate in a configuration in which the tire is assembled on a regular rim, filled with regular inner pressure, placed perpendicularly with respect to the flat plate in a static state, and loaded with a load corresponding to a regular load.

The total tire width SW refers to a linear distance (including all portions such as letters and patterns on the tire surface) between the side walls when the tire is assembled on a standard rim and filled with regular inner pressure and is in an unloaded state.

Herein, "standard rim" refers to a "standard rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular inner pressure is an air pressure of 180 kPa, and the regular load is 88% of the maximum load capacity.

Moreover, the width Ws of the circumferential reinforcing layer 145 and the cross-sectional width Wca of the carcass layer 13 have a relationship such that $0.60 \leq Ws/Wca \leq 0.70$ (see FIG. 1).

The width Ws of the circumferential reinforcing layer 145 is measured when the tire is assembled on a standard rim, inflated to a regular inner pressure and is in an unloaded state. The width Ws of the circumferential reinforcing layer 145 is the distance between the outermost end portions of the divided portions when the circumferential reinforcing layer 145 has a structure that is divided in the tire width direction (not illustrated in the drawings). The cross-sectional width Wca of the carcass layer 13 refers to a linear distance between the left and right maximum width positions when the tire is mounted on a standard rim and filled with regular inner pressure and is in an unloaded state.

Additionally, the tread width TW and the cross-sectional width Wca of the carcass layer 13 have a relationship such that $0.82 \leq TW/Wca \leq 0.92$ (see FIG. 1). As a result, the ratio TW/Wca is made appropriate.

The cross-sectional width Wca of the carcass layer 13 refers to a linear distance between the left and right maximum width positions when the tire is assembled on a standard rim and filled with regular inner pressure and is in an unloaded state.

Figure 5A:
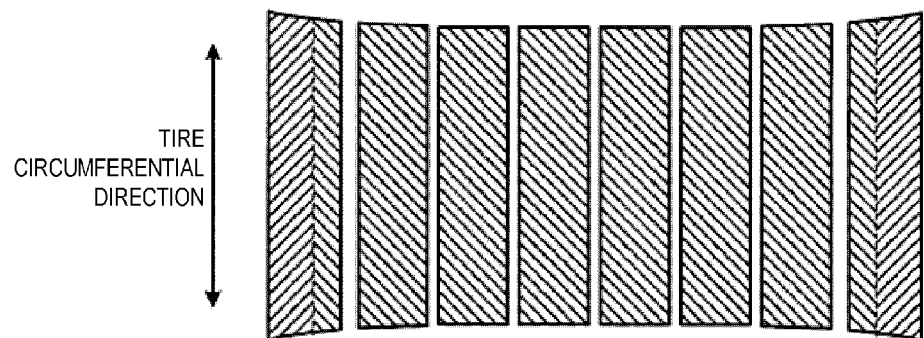
FIG. 5 is an explanatory view illustrating the effect of the pneumatic tire depicted in FIG. 1.
Figure 5B:
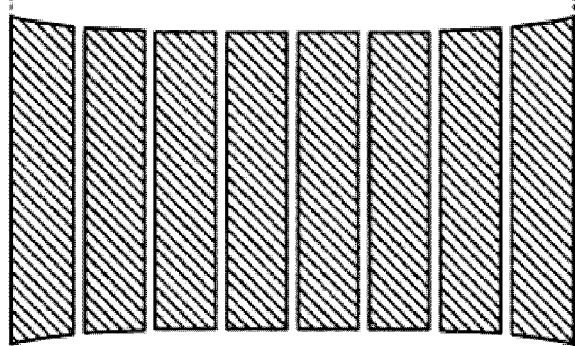

FIG. 5 is an explanatory view illustrating the effect of the pneumatic tire depicted in FIG. 1. A (a) Comparative Example and a (b) Working Example in FIG. 5 both illustrate ground contact shapes of the pneumatic tire having the circumferential reinforcing layer. However, in the Comparative Example in FIG. 5(a), the ratio TW/SW, the ratio Ws/Wca and the ratio TW/Wca are outside of the above-mentioned ranges, while on the other hand, in the Working Example in FIG. 5(b), the ratio TW/SW, the ratio Ws/Wca and the ratio TW/Wca are within the above-mentioned ranges.

In the configuration in FIG. 5(a), stiffness of the belt layer in the tire circumferential direction is reinforced and tire durability is improved due to the belt layer having the circumferential reinforcing layer. However, the radial growth in the left and right shoulder portions is large since the above ratios TW/SW, Ws/Wca, and TW/Wca are improper and thus the contact pressure distribution in the tire width direction is not uniform. As a result, a load on the belt layer is concentrated in one portion, thus making the effect of improved tire durability due to the circumferential reinforcing layer difficult to achieve.

Conversely, with the configuration in FIG. 5(b), while the circumferential reinforcing layer 145 reinforces the stiffness of the belt layer 14, radial growth in the shoulder portion is suppressed due to the ratios TW/SW, Ws/Wca, TW/Wca falling within the above-mentioned ranges. As a result, the difference in radial growth of a tread center region and a shoulder region is reduced. Specifically, when comparing FIGS. 5(a) and 5(b), it can be seen that deformation when the tire makes ground contact is reduced with the configuration in FIG. 5(b). As a result, there is an advantage that the contact pressure distribution of the tire is made uniform, a load on the belt layer 14 is distributed, and tire durability is improved. Specifically, (a) separation of the rubber around the edge portion of the belt ply and (b) separation of the rubber between contiguous belt plies are effectively suppressed.

Detailed Configuration of Belt Layer and Profile

In the pneumatic tire 1, a width Wb2 of the wider cross belt 142 of the pair of cross belts 142, 143, and the cross-sectional width Wca of the carcass layer 13 preferably have a relationship such that $0.79 \leq Wb2/Wca \leq 0.89$ (see FIG. 1). As a result, the ratio Wb2/Wca is made appropriate.

Additionally, a width Wb1 of the large angle belt 141 and a width Wb3 of the narrower cross belt 143 of the pair of cross belts 142, 143 preferably have a relationship such that $0.85 \leq Wb1/Wb3 \leq 1.05$ (see FIG. 3). As a result, the ratio Wb1/Wb3 is made appropriate.

The widths Wb2, Wb3 of the cross belts 142, 143 are measured as distances in the tire width direction when the tire is assembled on a standard rim, inflated to a regular inner pressure, and no load is applied.

In the configuration in FIG. 1, the belt layer 14 has a structure with left-right symmetry around the tire equatorial plane CL as illustrated in FIG. 3, and the width Wb1 of the large angle belt 141 and the width Wb3 of the narrower cross belt 143 have a relationship such that $Wb1 \leq Wb3$. As a result, an edge portion of the large angle belt 141 is disposed on an inner side in the tire width direction than the edge portion of the narrower cross belt 143 in a region on either side of the tire equatorial plane CL. However, the configuration is not limited thereto, and the width Wb1 of the large angle belt 141 and the width Wb3 of the narrower cross belt 143 may have a relationship such that Wb1≥Wb3 (not illustrated in the drawings).

Moreover, a diameter Ya of the highest position and a diameter Ye of the widest position of the carcass layer 13 preferably have a relationship such that 0.80≤Yc/Ya≤0.90 (see FIG. 1). As a result, the diameter ratio Yc/Ya of the carcass layer 13 is made appropriate.

The diameter Ya of the highest position of the carcass layer 13 is measured as the distance from the tire rotational axis to the intersection of the tire equatorial plane CL and the carcass layer 13 when the tire is assembled on a standard rim and filled with a regular inner pressure and is in an unloaded state. The diameter Yc of the widest position of the carcass layer 13 is measured as the distance from the tire rotational axis to the widest position of the carcass layer 13 when the tire is assembled on a standard rim and filled with a regular inner pressure and is in an unloaded state.

Moreover, belt cords 1411 that constitute the large angle belt 141 are steel wire, and the large angle belt 141 preferably has not less than 15 ends/50 mm and not more than 25 ends/50 mm (see FIG. 4). Moreover, belt cords 1421, 1431 that constitute the pair of cross belts 142, 143 are steel wire, and the pair of cross belt 142, 143 preferably has not less than 18 ends/50 mm and not more than 28 ends/50 mm. Also, the belt cords 1451 that constitute the circumferential reinforcing layer 145 are steel wire, and the circumferential reinforcing layer 145 preferably has not less than 17 ends/50 mm and not more than 30 ends/50 mm. As a result, the strengths of the belt plies 141, 142, 143, 145 are properly secured.

Moreover, a modulus E1 at 100% elongation of the coating rubber 1412 of the large angle belt 141 and a modulus Es at 100% elongation of the coating rubber 1452 of the circumferential reinforcing layer 145 preferably have a relationship such that 0.90≤Es/E1≤1.10 (see FIG. 4). Moreover, moduli E2, E3 at 100% elongation of the coating rubbers 1422, 1432 of the pair of cross belts 142, 143, and the modulus Es at 100% elongation of the coating rubber 1452 of the circumferential reinforcing layer 145 preferably have a relationship such that 0.90≤Es/E2≤1.10 and 0.90≤Es/E3≤1.10. Moreover, the modulus Es at 100% elongation of the coating rubber 1452 of the circumferential reinforcing layer 145 preferably is in ranges such that 4.5 MPa≤Es≤7.5 MPa. As a result, the moduli of the belt plies 141, 142, 143, 145 are made appropriate.

The modulus at 100% elongation is measured in a tensile test at ambient temperature in conformance with Japanese Industrial Standards JIS K6251 (using dumbbell no. 3).

Moreover, a breaking elongation λ1 of the coating rubber 1412 of the large angle belt 141 is preferably equal to or greater than 200% (see FIG. 4). Moreover, breaking elongations λ2, λ3 of the coating rubbers 1422, 1432 of the pair of cross belts 142, 143 are both preferably equal to or greater than 200%. Moreover, a breaking elongation λs of the coating rubber 1452 of the circumferential reinforcing layer 145 is preferably equal to or greater than 200%. As a result, the durability of the belt plies 141 142, 143, 145 is properly secured.

Breaking elongation is measured by performing a tensile test on a test sample of the JIS-K7162 specification 1B shape (dumb bell shape with a thickness of 3 mm) using a tensile tester (INSTRON5585H manufactured by Instron Corp.) conforming to JIS-K7161 at a pulling speed of 2 mm/min.

Further, in the configuration in FIG. 1, the large angle belt 141 and the cross belt 142 on the inner side in the tire radial direction of the pair of cross belts 142, 143 are disposed contiguous to each other as illustrated in FIGS. 3 and 4. In this case, an intercord distance D1 between the belt cords 1411 of the large angle belt 141 and the belt cords 1421 of the cross belt 142 on the inner side in the tire radial direction (see FIG. 4) is preferably in in ranges such that 0.50 mm≤D1≤1.50 mm. As a result, the intercord distance D1 between the large angle belt 141 and the cross belt 142 is made appropriate.

The intercord distance of the belt plies can be defined for each of the adjacent belt plies. Also, the intercord distance is the thickness of the rubber material between belt cords.

Moreover, the intercord distance, for example, is measured by the following condition. The tire is assembled on a standard rim and filled with the regular inner pressure under no load, and the tire unit is applied and fixed with tape or the like to the imaginary line of the tire profile measured by a laser profiler, for example. Next, for between the belt layers to be measured, the distance between the bottom edge position of the wire on the outer side in the tire radial direction and the upper edge position of the wire on the inner side in the tire radial direction is measured using a calipers or the like, and the value is taken to be the intercord distance. The laser profiler used here is a tire profile measuring device (manufactured by Matsuo Co., Ltd.).

Elongation is preferably not less than 1.0% and not more than 2.5% when the tensile load of the belt cords as components that configure the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have good elongation when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Also, as illustrated in FIG. 3, the circumferential reinforcing layer 145 is preferably disposed inward in the tire width direction from the left and right edge portions of the narrower cross belt 143 of the pair of cross belts 142, 143. Also, preferably the width Wb3 of the narrower cross belt 143 and the distance S from the edge portion of the circumferential reinforcing layer 145 to the edge portion of the narrower cross belt 143 are in the ranges such that 0.03≤S/Wb3. As a result, the distance between the end portions of the width Wb3 of the cross belt 143 and the end portions of the circumferential reinforcing layer 145 are properly secured. This point is the same even if the circumferential reinforcing layer 145 has a divided structure (not illustrated in the drawings).

The distance S of the circumferential reinforcing layer 145 is measured as a distance in the tire width direction when the tire is assembled on a standard rim, inflated to a regular inner pressure, and no load is applied.

Belt Cushion

As illustrated in FIG. 2, the pneumatic tire 1 includes a belt cushion 20. The belt cushion 20 is interposed between the carcass layer 13 and the end portion of the cross belt 142 on the inner side in the tire radial direction of the pair of cross belts 142, 143. For example, in the configuration in FIG. 2, an end portion of the belt cushion 20 on the outer side in the tire radial direction is inserted between the carcass layer 13 and the end portion of the cross belt 142, and abuts the edge portion of the large angle belt 141. The belt cushion 20 extends on the inner side in the tire radial direction along the carcass layer 13 and is interposed between the carcass layer 13 and the side wall rubber 16. Further, a pair of left and right belt cushions 20 are respectively disposed at the left and right side wall portions of the tire.

A modulus Ebc at 100% elongation of the belt cushion 20 is in ranges such that 1.5 MPa≤Ebc≤3.0 MPa. The belt cushion 20 demonstrates a stress alleviation effect due to the modulus Ebc of the belt cushion 20 being within such a range, and the separation of the periphery rubber at the end portions of the cross belt 142 is suppressed.

Further, a breaking elongation λbc of the belt cushion 20 is equal to or greater than 400%. As a result, the durability of the belt cushion 20 is properly secured.

Also, in the configuration in FIG. 1, the circumferential reinforcing layer 145 is constituted from a single steel wire that is wound spirally. However, the configuration is not limited thereto, and the circumferential reinforcing layer 145 may be constituted from a plurality of wires wound spirally around side-by-side to each other (multiple winding structure). In this case, preferably, the number of wires is not greater than 5. Additionally, the width of winding per unit when five wires are wound in multiple layers is preferably not more than 12 mm. As a result, a plurality of wires (not less than 2 and not more than 5 wires) can be wound properly at a slant within a range of ±5° with respect to the tire circumferential direction.

Also, in the configuration in FIG. 2, the circumferential reinforcing layer 145 is disposed so as to be interposed between the pair of cross belts 142, 143 (see FIG. 2). However, the configuration is not limited thereto, and the circumferential reinforcing layer 145 may also be disposed on the outer side in the tire radial direction of the pair of cross belts 141, 142 (not illustrated in the drawings). Also, the circumferential reinforcing layer 145 may be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated in the drawings).

Belt Edge Cushion Two-Color Structure

Figure 6:
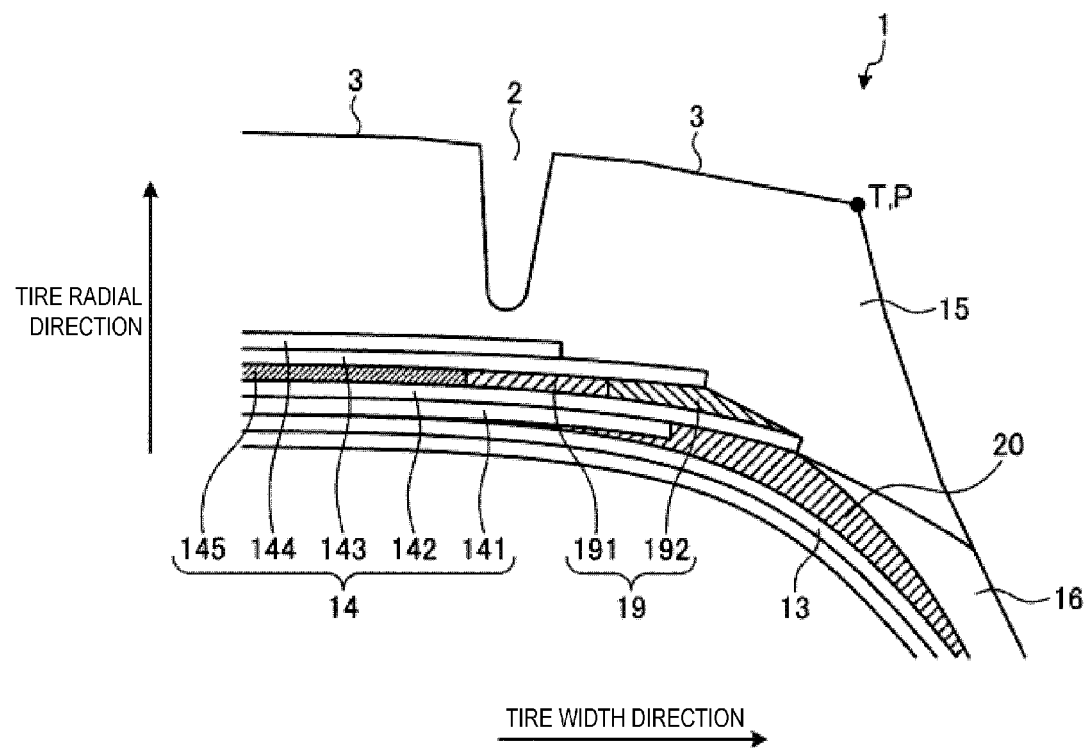
FIG. 6 is an explanatory view illustrating a modified example of the pneumatic tire depicted in FIG. 1.

FIG. 6 is an explanatory view of a modified example of the pneumatic tire depicted in FIG. 1. FIG. 6 is an enlarged view of an end portion of the belt layer 14 on the outer side in the tire width direction. The circumferential reinforcing layer 145, the belt edge cushion 19, and the belt cushion 20 in FIG. 6 are indicated by hatching.

In the configuration in FIG. 1, the circumferential reinforcing layer 145 is disposed inward in the tire width direction from the left and right edge portions of the narrower cross belt 143 of the pair of cross belts 142, 143. The belt edge cushion 19 is interposed between the pair of cross belts 142, 143 and disposed at a position contacting the edge of each of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that 0.60≤E/Eco≤0.95. As a result, the occurrence of separation of the rubber materials in a region between the pair of cross belts 142, 143 and on the outer side in the tire width direction of the circumferential reinforcing layer 145 is suppressed.

Conversely, according to the configuration in FIG. 6, the belt edge cushion 19 in the configuration in FIG. 1 has a two-color structure composed of a stress relief rubber 191 and an edge portion relief rubber 192. The stress relief rubber 191 is disposed between the pair of cross belts 142, 143 and flanks the circumferential reinforcing layer 145 on the outer side of the circumferential reinforcing layer 145 in the tire width direction. The edge portion relief rubber 192 is disposed between the pair of cross belts 142, 143 and at a position on the outer side of the stress relief rubber 191 in the tire width direction and contacting the edge of each of the pair of cross belts 142, 143. Therefore, when viewed as a cross-section from the tire meridian direction, the belt edge cushion 19 has a structure composed by disposing the stress relief rubber 191 and the edge portion relief rubber 192 side to side in the tire width direction to fill a region from the end portion on the outer side of the circumferential reinforcing layer 145 in the tire width direction to the edge portion of the pair of cross belts 142, 143.

Moreover, a modulus Ein at 100% elongation of the stress relief rubber 191 and the modulus Eco at 100% elongation of the coating rubber of the cross belts 142, 143 have a relationship of Ein≤Eco in the configuration in FIG. 6. Specifically, the modulus Ein of the stress relief rubber 191 and the modulus Eco of the coating rubber preferably have a relationship such that 0.6≤Ein/Eco≤0.9. Additionally, the modulus Ein at 100% elongation of the stress relief rubber 191 preferably is in ranges such that 4.0 MPa≤Ein≤5.5 MPa.

Moreover, a modulus Eout at 100% elongation of the edge portion relief rubber 192 and the modulus Ein at 100% elongation of the stress relief rubber 191 have a relationship of Eout≤Ein in the configuration in FIG. 6.

Since the stress relief rubber 191 is disposed on the outer side of the circumferential reinforcing layer 145 in the tire width direction in the configuration of FIG. 6, shearing strain of the periphery rubbers between the edge portion of the circumferential reinforcing layer 145 and the cross belts 142, 143 is alleviated. Moreover, since the edge portion relief rubber 192 is disposed at a position contacting the edge of each of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

Effect

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). Moreover, the belt layer 14 is configured by laminating the large angle belt 141 having a belt angle of not less than 45° and not more than 70° in absolute values, the pair of cross belts 142, 143 having the belt angle of not less than 10° and not more than 45° in absolute values and having belt angles of mutually opposite signs, and the circumferential reinforcing layer 145 having the belt angle within a range of ±5° with respect to the tire circumferential direction (see FIG. 3). Moreover, the tread width TW and the total tire width SW have a relationship such that 0.79≤TW/SW≤0.89 (see FIG. 1). Moreover, the width Ws of the circumferential reinforcing layer 145 and the cross-sectional width Wca of the carcass layer 13 have a relationship such that 0.60≤Ws/Wca≤0.70 (see FIG. 1).

In such a configuration, there is an advantage that stiffness in the tire circumferential direction is reinforced and tire durability is improved due to the belt layer 14 having the circumferential reinforcing layer 145. Also, a difference in radial growths between the center region and the shoulder region is alleviated (see FIG. 5(*b*)) and the contact pressure distribution in the tire width direction is made uniform due to the ratio TW/SW being within the above range. As a result, there is an advantage that a load on the belt layer 14 is distributed and tire durability is improved. Specifically, an average ground contact pressure is reduced due to the ratio TW/SW being equal to or greater than 0.79. Moreover, rising of the shoulder portion is suppressed and deformation when the tire makes ground contact is suppressed due to the ratio TW/SW being less than or equal to 0.89.

Moreover, in such a configuration, there is an advantage that tire durability is further improved due to the ratio Ws/Wca being within the above range. Specifically, the strength of the circumferential reinforcing layer 145 is properly secured due to the ratio Ws/Wca being equal to or greater than 0.60, and fatigue rupture of the belt cords at the edge portions of the circumferential reinforcing layer 145 is suppressed due to the ratio Ws/Wca being less than or equal to 0.70.

Additionally, in the pneumatic tire 1, the tread width TW and the cross-sectional width Wca of the carcass layer 13 have a relationship such that 0.82≤TW/Wca≤0.92 (see FIG. 1). In such a configuration, a difference in radial growths between the center region and the shoulder region is alleviated (see FIG. 5(*b*)) and the contact pressure distribution in the tire width direction is made uniform due to the ratio TW/Wca being within the above range. As a result, there is an advantage that a load on the belt layer 14 is distributed and tire durability is improved. Specifically, an average ground contact pressure is reduced due to the ratio TW/Wca being equal to or greater than 0.82. Moreover, rising of the shoulder portion is suppressed, deformation when the tire makes ground contact is suppressed, and a load on the belt layer 14 is effectively distributed due to the ratio TW/Wca being less than or equal to 0.92.

In the pneumatic tire 1, the width Wb2 of the wider cross belt 142 of the pair of cross belts 142, 143, and the cross-sectional width Wca of the carcass layer 13 have a relationship such that 0.79≤Wb2/Wca≤0.89 (see FIG. 1). With such a configuration, there is an advantage that tire durability is further improved due to the ratio Wb2/Wca being within the above range. Specifically, the strength of the wider cross belt 142 is properly secured due to the ratio Wb2/Wca being equal to or greater than 0.79, and fatigue rupture of the belt cords at the edge portions of the wider cross belt 142 is suppressed due to the ratio Wb2/Wca being less than or equal to 0.89.

Additionally, in the pneumatic tire 1, the width Wb1 of the large angle belt 141 and the width Wb3 of the narrower cross belt 143 of the pair of cross belts 142, 143 have a relationship such that 0.85≤Wb1/Wb3≤1.05. With such a configuration, there is an advantage that the ratio Wb1/Wb3 between the width Wb1 of the large angle belt 141 and the width Wb3 of the narrower cross belt 143 is made appropriate and tire durability is improved.

Moreover, in the pneumatic tire 1, the diameter Ya of the highest position and the diameter Yc of the widest position of the carcass layer 13 have a relationship such that 0.80≤Yc/Ya≤0.90 (see FIG. 1). With such a configuration, there is an advantage that the diameter ratio Yc/Ya of the carcass layer 13 is made appropriate. Specifically, the shape of the carcass layer 13 is made appropriate and strain at the tire belt end portions is suppressed due to Yc/Ya being equal to or greater than 0.80. Further, the tire shape is properly maintained due to the ratio Yc/Ya being less than or equal to 0.90.

Also, in the pneumatic tire 1, the belt cords that constitute the circumferential reinforcing layer 145 is steel wire, and the circumferential reinforcing layer 145 has not less than 17 ends/50 mm and not more than 30 ends/50 mm. As a result, there is an advantage that the durability of the tire is properly secured. Specifically, the strength of the circumferential direction reinforcing layer 145 is properly secured due to the circumferential reinforcing layer 145 having at least 17 ends/50 mm. Moreover, the amount of rubber of the coating rubber of the circumferential reinforcing layer 145 is properly secured and separation of the rubber materials between the contiguous belt plies (the pair of cross belts 142, 143 and the circumferential reinforcing layer 145 in FIG. 3) is suppressed due to the circumferential reinforcing layer 145 having not more than 30 ends/50 mm.

Moreover, in the pneumatic tire 1, the belt cords of the large angle belt 141 are steel wire, and the large angle belt 141 has not less than 15 ends/50 mm and not more than 25 ends/50 mm (see FIG. 3). As a result, there is an advantage that the durability of the tire is properly secured. Specifically, the strength of the large angle belt 141 is properly secured due to the large angle belt 141 having not less than 15 ends/50 mm. Moreover, the amount of rubber of the coating rubber of the large angle belt 141 is properly secured and separation of the rubber material between the contiguous belt plies (the cross belt 142 in FIG. 3) is suppressed due to the large angle belt 141 having not more than 25 ends/50 mm.

In the pneumatic tire 1, the pair of cross belts 142, 143 are disposed on the outer side in the tire radial direction of the large angle belt 141, and the circumferential reinforcing layer 145 is disposed on the outer side in the tire radial direction of the pair of cross belts (not illustrated), between the pair of cross belt 142, 143, on the inner side in the tire radial direction of the pair of cross belt 142, 143, or on the inner side in the tire radial direction of the large angle belt 141 (not illustrated). Moreover, the large angle belt 141 and the cross belt 142 that is on the inner side in the tire radial direction of the pair of cross belts 142, 143 have belt angles with the same sign (see FIG. 3). By applying this pneumatic tire 1 having such a configuration, there is an advantage that a noticeable effect in tire durability improvement is achieved.

Moreover, in the pneumatic tire 1, the belt cords of the pair of cross belts 142, 143 are steel wire, and the pair of cross belts 142, 143 has not less than 18 ends/50 mm and not more than 28 ends/50 mm (see FIG. 3). As a result, there is an advantage that the durability of the tire is properly secured. Specifically, the strength of the pair of cross belts 142, 143 is properly secured due to the pair of cross belts 142, 143 having not less than 18 ends/50 mm. Moreover, the amount of rubber of the coating rubber of the pair of cross belts 142, 143 is properly secured and separation of the rubber materials between the contiguous belt plies (the large angle belt 141 and the circumferential reinforcing layer 145 in FIG. 3) is suppressed due to the pair of cross belts 142, 143 having not more than 28 ends/50 mm.

Moreover, in the pneumatic tire 1, the modulus Es at 100% elongation of the coating rubber of the circumferential reinforcing layer 145 is in ranges such that 4.5 MPa≤Es≤7.5 MPa. As a result, there is an advantage that the durability of the tire is properly secured. Specifically, the strength of the circumferential direction reinforcing layer 145 is properly secured due to the modulus Es being equal to or greater than 4.5 MPa. Moreover, the stress alleviation effect is properly secured due to the coating rubber, and separation of the rubber materials between the contiguous belt plies (the pair of cross belts 142, 143 in FIG. 3) is suppressed due to the modulus Es being less than or equal to 7.5 MPa.

Moreover, in the pneumatic tire 1, a modulus E1 at 100% elongation of the coating rubber 1412 of the large angle belt 141 and a modulus Es at 100% elongation of the coating rubber 1452 of the circumferential reinforcing layer 145 have a relationship such that 0.90≤Es/E1≤1.10 (see FIG. 4). As a result, there is an advantage that the stress alleviation effect of the coating rubber is properly secured due to the ratio Es/E1 being made appropriate.

Moreover, in the pneumatic tire 1, the moduli E2, E3 at 100% elongation of the coating rubbers 1422, 1432 of the pair of cross belts 142, 143, and the modulus Es at 100% elongation of the coating rubber 1452 of the circumferential reinforcing layer 145 have a relationship such that 0.90≤Es/E2≤1.10 and 0.90≤Es/E3≤1.10 (see FIG. 4). As a result, there is an advantage that the stress alleviation effect of the coating rubber is properly secured due to the ratios Es/E2, Es/E3 being made appropriate.

Moreover, in the pneumatic tire 1, the breaking elongation λs of the coating rubber 1452 of the circumferential reinforcing layer 145 is equal to or greater than 200% (see FIG. 4). As a result, there is an advantage that the durability of the circumferential reinforcing layer 145 is properly secured.

Moreover, in the pneumatic tire 1, the breaking elongation λ1 of the coating rubber 1412 of the large angle belt 141 is equal to or greater than 200% (see FIG. 4). As a result, there is an advantage that the durability of the large angle belt 141 is properly secured.

Moreover, in the pneumatic tire 1, the breaking elongations λ2, λ3 of the coating rubbers 1422, 1432 of the pair of cross belts 142, 143 are both less than or equal to 200%. As a result, there is an advantage that the durability of the pair of cross belts 142, 143 is properly secured.

The pneumatic tire 1 includes the belt cushion 20 interposed between the carcass layer 13 and the end portion of the cross belt 142 that is on the inner side of the pair of cross belts 142, 143 in the tire radial direction (see FIGS. 1 and 2). A modulus Ebc at 100% elongation of the belt cushion 20 is in ranges such that 1.5 MPa≤Ebc≤3.0 MPa. With such a structure, the belt cushion 20 is disposed between the carcass layer 13 and the cross belt 142 on the inner side in the tire radial direction, and the modulus Ebc of the belt cushion 20 is made appropriate. As a result, there is an advantage that the belt cushion 20 demonstrates a stress alleviation effect and the separation of the periphery rubber at the end portions of the cross belt 142 is suppressed. Specifically, the durability of the belt cushion 20 is properly secured due to the modulus Ebc being equal to or greater than 1.5 MPa, and the stress alleviation effect of the belt cushion 20 is properly secured due to the modulus Ebc being less than or equal to 3.0 MPa.

Further, in the pneumatic tire 1, the breaking elongation λbc of the belt cushion 20 is equal to or greater than 400%. As a result, there is an advantage that the durability of the belt cushion 20 is properly secured.

Moreover, in the pneumatic tire 1, the large angle belt 141 and the cross belt 142 that is on the inner side of the pair of cross belts 142, 143 in the tire radial direction are disposed contiguous to each other (see FIGS. 3 and 4). Moreover, the intercord distance D1 between the belt cords 1411 of the large angle belt 141 and the belt cords 1421 of the cross belt 142 is in ranges such that 0.50 mm≤D1≤1.50 mm. As a result, there is an advantage that the intercord distance D1 between the large angle belt 141 and the cross belt 142 is made appropriate. Specifically, the thickness of the rubber material between the adjacent belt cords is secured and the stress alleviation effect between the large angle belt 141 and the cross belt 142 is properly secured due to the distance D1 being equal to or greater than 0.50 mm. Moreover, a fastening effect between the large angle belt and the cross belt can be secured due to the distance D1 being less than or equal to 1.50 mm.

In the pneumatic tire 1, elongation is not less than 1.0% and not more than 2.5% when the tensile load of the belt cords as components that configure the circumferential reinforcing layer 145 is from 100 N to 300 N. As a result, there is an advantage that the effect of suppressing radial growth in the center region is properly secured due to the circumferential reinforcing layer 145.

In the pneumatic tire 1, elongation is not less than 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly secured due to the circumferential reinforcing layer 145.

In the pneumatic tire 1, the circumferential reinforcing layer 145 is disposed inward in the tire width direction from the left and right edges of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 are in the ranges such that 0.03≤S/Wb3. As a result, there is an advantage that the distance between the end portion of the width Wb3 of the cross belt 143 and the end portion of the circumferential reinforcing layer 145 is properly secured, and separation of rubber materials at the end portion of the circumferential direction reinforcing layer 145 is suppressed.

In the pneumatic tire 1, the circumferential reinforcing layer 145 is disposed inward in the tire width direction from the left and right edge portions of the narrower cross belt 143 of the pair of cross belts 142, 143 (see FIG. 3). The pneumatic tire 1 includes the stress relief rubber 191 disposed between the pair of cross belts 142, 143 and at a position on the outer side of the circumferential reinforcing layer 145 in the tire width direction and flanking the circumferential reinforcing layer 145, and the edge portion relief rubber 192 disposed between the pair of cross belts 142, 143 and at a position on the outer side of the stress relief rubber 191 in the tire width direction and contacting the edge of each of the pair of cross belts 142, 143 (see FIG. 6).

In such a configuration, there is an advantage that fatigue rupture of the periphery rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shearing strain of the periphery rubber between the edge portion of the circumferential reinforcing layer 145 and the cross belts 142, 143 is alleviated. Moreover, since the edge portion relief rubber 192 is disposed at a position contacting the edge of each of the cross belts 142, 143, shearing strain of the peripheral rubbers at the edge portions of the cross belts 142, 143 is alleviated. Accordingly, there is an advantage that separation of the periphery rubber of the circumferential reinforcing layer 145 is suppressed.

In the pneumatic tire 1, the modulus Ein at 100% elongation of the stress relief rubber 191 and the modulus Eco at 100% elongation of the coating rubber of the pair of cross belts 142, 143 have a relationship such that Ein<Eco (see FIG. 6). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

In the pneumatic tire 1, the modulus Ein at 100% elongation of the stress relief rubber 191 and the modulus Eco at 100% elongation of the coating rubber of the pair of cross belts 142, 143 have a relationship such that 0.6≤Ein/Eco≤0.9 (see FIG. 6). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Additionally, in the pneumatic tire 1, the modulus Ein at 100% elongation of the stress relief rubber 191 is in ranges such that 4.0 MPa≤Ein≤5.5 MPa (see FIG. 6). As a result, there is an advantage that the modulus Ein of the stress relief rubber 191 is made appropriate and the shearing strain of the periphery rubber between the edge portion of the circumferential reinforcing layer 145 and the cross belts 142, 143 is alleviated.

Target of Application

The pneumatic tire 1 is preferably applied to a heavy duty tire with an aspect ratio of not less than 40% and not more than 55% when assembled on a standard rim, inflated with the regular inner pressure and the standard load is applied. A heavy duty tire has a higher load under use than a passenger car tire. Thus, a radial difference occurs easily between the region where the circumferential reinforcing layer is disposed and the regions on the outer side of the circumferential reinforcing layer in the tire width direction. Moreover, a ground contact shape having an hourglass shape occurs easily in the tire having the above-mentioned low aspect ratio. Accordingly, a noticeable effect in improving the above-mentioned tire durability is achieved by applying the pneumatic tire 1 to such a heavy duty tire.

EXAMPLES

FIGS. 7*a* through 9*b* are tables showing results of performance testing of pneumatic tires according to embodiments of the present invention.

Evaluations of durability of a plurality of mutually different pneumatic tires were conducted for the performance tests. Specifically, evaluations related to (1) separation resistance (belt-belt separation resistance) of the rubber around the edge portions of the belt plies, and (2) separation resistance (belt-edge separation resistance) of the rubber between contiguous belt plies were performed (see FIGS. 7*a* through 9*b*). Pneumatic tires having a tire size of 445/50R22.5 were mounted on a TRA specification standard rim (rim size 22.5×14.0) and imparted with a TRA specification maximum air pressure loads of (830 kPa).

(1) Evaluations related to belt-belt separation resistance were conducted by low pressure durability testing using an indoor drum testing machine. The travel speed was set to 45 km/h, the load was set at 63.50 kN, and the slip angle was set to ±2° (sine wave 0.1 Hz) to measure the travel distance until the tire ruptured. Index scoring against a conventional standard score of 100 was conducted based on the measurement results. In these evaluations, higher scores were preferable. 110 or greater in the evaluations indicate superiority over the Conventional Examples, and 115 or greater demonstrate a sufficient effect.

(2) Evaluations related to belt edge separation resistance were conducted by low pressure durability testing using an indoor drum testing machine. The travel speed was set to 45 [km/h] and the load was gradually increased from 45.37 kN by 5% (2.27 kN) every 12 hours to measure the travel distance until the tire ruptured. Index scoring against a conventional standard score of 100 was conducted based on the measurement results. In these evaluations, higher scores were preferable.

The pneumatic tires 1 of Working Examples 1 to 48 had the configuration depicted in FIGS. 1 to 3. Further, the total tire width SW was SW=446 mm. Moreover, the modulus at 100% elongation of the coating rubber of all the belt layers 14 was 6.0 MPa.

The pneumatic tire 1 of Working Example 49 is a modified example of the configuration depicted in FIGS. 1 to 3 and had the configuration depicted in FIG. 6. The modulus Ein at 100% elongation of the stress relief rubber 191 was Ein=4.8 MPa.

In the configuration of FIGS. 1 to 3, the pneumatic tire of the Conventional Example does not have the circumferential reinforcing layer. The pneumatic tire of Comparative Example had the configuration depicted in FIGS. 1 to 3.

As is clear from the test results, the pneumatic tires 1 of the Working Examples 1 to 49 demonstrate improved tire durability.

The invention claimed is:

1. A pneumatic tire comprising a carcass layer, a belt layer disposed on an outer side of the carcass layer in a tire radial direction, and a tread rubber disposed on the outer side of the belt layer in the tire radial direction, wherein
    the belt layer is formed by laminating a large angle belt having a belt cord angle of not less than 45° and not more than 70° in absolute values, a pair of cross belts having belt cord angles of not less than 10° and not more than 45° in absolute values and having belt cord angles of mutually opposite signs, and a circumferential reinforcing layer having a belt cord angle within a range of ±5° with respect to a tire circumferential direction,
    the pair of cross belts are disposed on the outer side in the tire radial direction of the large angle belt,
    the circumferential reinforcing layer is disposed on the inner side in the tire radial direction of the pair of cross belts,
    a width Ws of the circumferential reinforcing layer and a cross-sectional width Wca of the carcass layer have a relationship such that 0.60≤Ws/Wca≤0.70;

a width Wb2 of a wider cross belt of the pair of cross belts, and the cross-sectional width Wca of the carcass layer have a relationship such that $0.79 \leq Wb2/Wca \leq 0.84$;

a tread width TW and a cross-sectional width Wca of the carcass layer have a relationship such that $0.82 \leq TW/Wca \leq 0.92$; and a diameter Ya of the highest position of the carcass layer and a diameter Yc of the widest position of the carcass layer have a relationship such that $0.80 \leq Yc/Ya \leq 0.90$.

2. The pneumatic tire according to claim 1, wherein the tread width TW and a total tire width SW have a relationship such that $0.79 \leq TW/SW \leq 0.89$.

3. The pneumatic tire according to claim 1, wherein a diameter Ya of the highest position of the carcass layer and a diameter Yc of the widest position of the carcass layer have a relationship such that $0.80 \leq Yc/Ya \leq 0.90$.

4. The pneumatic tire according to claim 1, wherein the circumferential reinforcing layer is disposed on the outer side in the tire radial direction of the large angle belt.

5. The pneumatic tire according to claim 1, wherein the circumferential reinforcing layer is disposed on the inner side in the tire radial direction of the large angle belt.

6. The pneumatic tire according to claim 1, wherein a width Wb1 of the large angle belt and a width Wb3 of a narrower cross belt of the pair of cross belts have a relationship such that $0.85 \leq Wb1/Wb3 \leq 1.05$.

7. The pneumatic tire according to claim 1, wherein the belt cords of the circumferential reinforcing layer are steel wire and have a number of ends of not less than 17 ends/50 mm and not more than 30 ends/50 mm.

8. The pneumatic tire according to claim 1, wherein a modulus Es at 100% elongation of a coating rubber coating the belt cords of the circumferential reinforcing layer is in ranges such that $4.5 \text{ MPa} \leq Es \leq 7.5 \text{ MPa}$.

9. The pneumatic tire according to claim 1, wherein a modulus E1 at 100% elongation of a coating rubber coating the belt cords of the large angle belt and a modulus Es at 100% elongation of a coating rubber coating the belt cords of the circumferential reinforcing layer are in ranges such that $0.90 \leq Es/E1 \leq 1.10$.

10. The pneumatic tire according to claim 1, wherein moduli E2, E3 at 100% elongation of coating rubbers coating the belt cords of the pair of cross belts and the modulus Es at 100% elongation of a coating rubber coating the belt cords of the circumferential reinforcing layer are in ranges such that $0.90 \leq Es/E2 \leq 1.10$ and $0.90 \leq Es/E3 \leq 1.10$.

11. The pneumatic tire according to claim 1, wherein a breaking elongation λs of a coating rubber coating the belt cords of the circumferential reinforcing layer is equal to or greater than 200%.

12. The pneumatic tire according to claim 1, wherein the circumferential reinforcing layer is disposed inward in the tire width direction of left and right edges of a narrower cross belt of the pair of cross belts, and a width Wb3 of the narrower cross belt and a distance S from an edge of the circumferential reinforcing layer to an edge of the narrower cross belt are in ranges such that $0.03 \leq S/Wb3$.

13. A pneumatic tire comprising a carcass layer, a belt layer disposed on an outer side of the carcass layer in a tire radial direction, and a tread rubber disposed on the outer side of the belt layer in the tire radial direction, wherein the belt layer is formed by laminating a large angle belt having a belt cord angle of not less than 45° and not more than 70° in absolute values, a pair of cross belts having belt cord angles of not less than 10° and not more than 45° in absolute values and having belt cord angles of mutually opposite signs, and a circumferential reinforcing layer having a belt cord angle within a range of ±5° with respect to a tire circumferential direction, the pair of cross belts are disposed on the outer side in the tire radial direction of the large angle belt, the circumferential reinforcing layer is disposed on the inner side in the tire radial direction of the pair of cross belts, a width Ws of the circumferential reinforcing layer and a cross-sectional width Wca of the carcass layer have a relationship such that $0.60 \leq Ws/Wca \leq 0.70$;

a width Wb2 of a wider cross belt of the pair of cross belts, and the cross-sectional width Wca of the carcass layer have a relationship such that $0.79 \leq Wb2/Wca \leq 0.84$;

a tread width TW and a total tire width SW have a relationship such that $0.79 \leq TW/SW \leq 0.89$; and a diameter Ya of the highest position of the carcass layer and a diameter Yc of the widest position of the carcass layer have a relationship such that $0.80 \leq Yc/Ya \leq 0.90$.

* * * * *